Sept. 12, 1933.  F. M. GIFFORD  1,926,979
REAR VISION MIRROR SHIELD
Filed Dec. 7, 1931
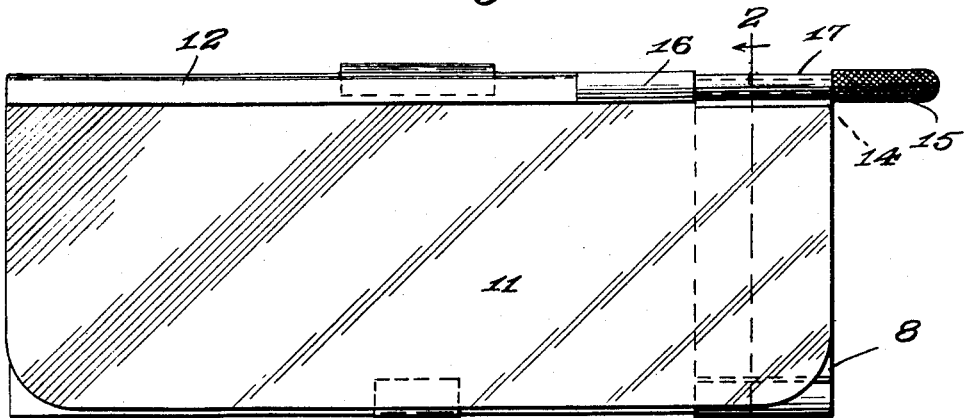
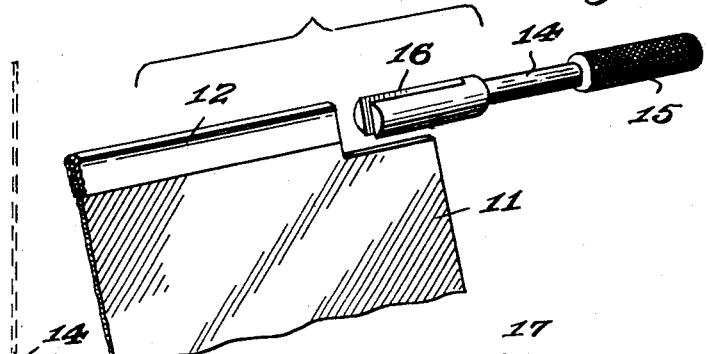
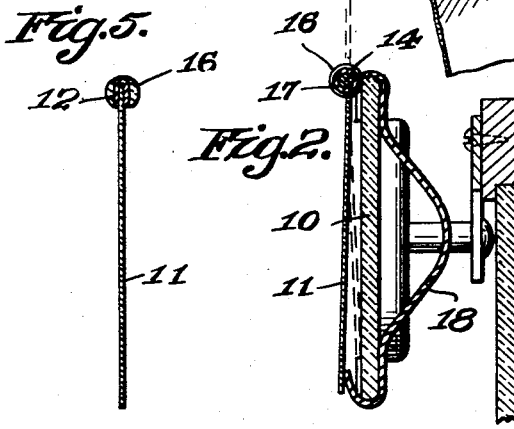
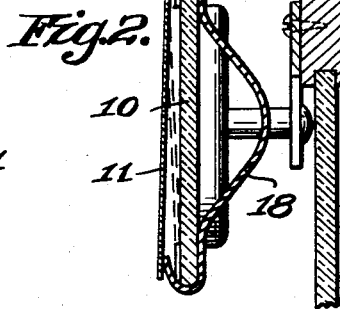
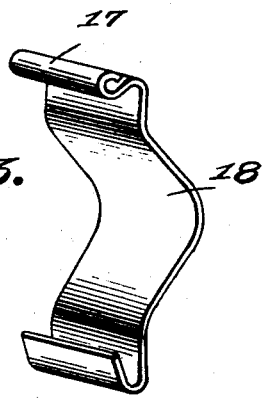
F. M. Gifford,
INVENTOR
BY Victor J. Evans & Co.
ATTORNEY Patented Sept. 12, 1933

1,926,979

UNITED STATES PATENT OFFICE 1,926,979

REAR VISION MIRROR SHIELD

Fred Monroe Gifford, Flint, Mich.

Application December 7, 1931. Serial No. 579,602

1 Claim. (Cl. 45—97)

The object of the device is to provide a shield for application to the rear vision mirror customarily used in motor vehicles for rearward observation, so that the glare attending the shining of headlights into the mirror may be eliminated; to provide a device of this kind which may be selectively positioned in shielding or unshielding relation with respect to the mirror; and to provide a device which is of simple form and, therefore, susceptible of cheap manufacture.

With this object in view, the invention consists in a construction and combination of parts of which a preferred embodiment is illustrated in the accompanying drawing but to which embodiment the invention is not to be restricted. The right is reserved to make such changes or alterations as actual reduction to practice may show to be advisable, insofar as such changes or alterations are comprehended in spirit by the annexed claim.

In the drawing:

Figure 1 is an elevational view of the rear vision mirror showing the invention applied in operative position.

Figure 2 is a sectional view on the plane indicated by the line 2—2 of Figure 1.

Figure 3 is a perspective view of the mounting clamp.

Figure 4 is a collective perspective view of a portion of the shield and the actuating means therefor.

Figure 5 is a vertical transverse sectional view through the shield proper.

The invention is designed as a means for disposing in obstructing relation to a rear vision mirror, such as that indicated at 10, so that the headlight rays of following vehicles may not be reflected by the mirror with the glaring intensity so annoying to the driver or operator. The shield constituting the vital element of the invention is indicated at 11 and consists of a sheet of transparent material provided at its upper edge with a reinforcement 12 with which the mounting spindle 14 is connected, the latter having a knurled portion 15 and a slotted bifurcated portion 16. The shield 11 is cut away at one end of the reinforcement and the bifurcated portion 16 is connected to the shield at this point, straddling the reinforcement to which it is secured.

This arrangement disposes the journal portion 14 above the clearance space formed by cutting the shield away at one end of the reinforcement.

The journal portion 14 is mounted in a friction bearing 17 formed at the upper end of a spring mounted clamp member 18 which is designed to embrace the mirror 10 at the upper and lower edges of the latter, so as to dispose the bearing 17 to the front of the mirror at one end. Thus, in one position of the spindle 14, the shield is down in obstructing relation to the mirror, while in another position it is out of obstructing relation, as shown in dotted lines in Figure 2.

The bearing 17 is formed by coiling the extremity of the clamp member 18 and this coiled portion surrounds the journal 19, the spring tendency of the stop employed tending to create a snug frictional fit between the journal and its bearing, so that the shield is maintained in any desired position to which it may be moved by adjustment of the handle 15.

The invention having been described, what is claimed as new and useful is:

A mirror shield comprising a dull transparency, and a mounting bracket adapted to engage a rear vision mirror and adjustably supporting the transparency, the bracket consisting of a spring clamp embracing the mirror at the upper and lower edges thereof and terminally formed with a coil at the upper edge of the mirror, the transparency being provided with an actuating spindle having a journal embraced by said coiled portion for frictional engagement by the latter, so that the transparency may be retained in any position of angular adjustment with reference to said mirror.

FRED MONROE GIFFORD.